United States Patent [19]
Schilling et al.

[11] Patent Number: 5,947,688
[45] Date of Patent: Sep. 7, 1999

[54] FREQUENCY TUNED HYBRID BLADE

[75] Inventors: Jan C. Schilling, Middletown; Jay L. Cornell, Hamilton; Joseph T. Stevenson, Amelia, all of Ohio

[73] Assignee: General Electric Company, Cincinnati, Ohio

[21] Appl. No.: 08/995,975

[22] Filed: Dec. 22, 1997

[51] Int. Cl.$^6$ .............................. B63H 1/26; B64C 11/24
[52] U.S. Cl. ...................... 416/233; 416/237; 416/241 A
[58] Field of Search .................. 416/224, 229 A, 416/229 R, 230, 232, 233, 241 A, 241 B

[56] References Cited

U.S. PATENT DOCUMENTS

| | | |
|---|---|---|
| 5,295,789 | 3/1994 | Daguet ................................ 416/241 A |
| 5,407,326 | 4/1995 | Lardellier ................................ 416/233 |
| 5,634,771 | 6/1997 | Howard et al. ...................... 416/241 A |
| 5,655,883 | 8/1997 | Schilling ............................. 416/229 A |
| 5,839,882 | 11/1998 | Finn et al. ........................... 416/229 A |

*Primary Examiner*—John E. Ryznic
*Attorney, Agent, or Firm*—Andrew C. Hess; Rodney M. Young

[57] ABSTRACT

A fan blade includes a metal airfoil having first and second opposite sides extending radially between a root and tip, and axially between a leading edge and a trailing edge. The airfoil further includes a plurality of pockets disposed in the first side and separated by corresponding ribs. A filler is bonded in the pocket, and is coextensive with the airfoil first side. Radial and diagonal ribs respectively intersect solely each other for selectively increasing torsional and bending stiffness to increase frequency margin between adjacent torsional and bending resonant modes of vibration.

12 Claims, 2 Drawing Sheets

FREQUENCY TUNED HYBRID BLADE

BACKGROUND OF THE INVENTION

The present invention relates generally to gas turbine engines, and, more specifically, to wide chord fan blades therein.

A turbofan gas turbine engine includes a row of fan blades powered by a low pressure turbine (LPT). Air initially enters the engine through the fan and an inner portion thereof enters a compressor which pressurizes the air for mixing with fuel in a combustor and ignited for generating hot combustion gases which flow downstream through a high pressure turbine (HPT) which extracts energy for powering the compressor. The combustion gases then flow through the LPT which extracts additional energy therefrom for powering the fan. The remaining outer portion of the air flowing through the fan is discharged from the engine for producing thrust to power an aircraft in flight.

A fan blade includes a dovetail at its radially inner end which is trapped in a complementary dovetail slot in the perimeter of a rotor disk. An airfoil is attached to the dovetail by a structural shank. Platforms may be joined integrally with the blade or separately attached between adjacent blades for providing a radially inner flowpath boundary for the fan air, with the platform being radially located atop the shank at a radially inner root of the airfoil.

The airfoil extends radially outwardly to an opposite tip, and has a forward or leading edge and an axially opposite aft or trailing edge collectively defining the perimeter of the airfoil. The airfoil has a generally concave or pressure first side and a circumferentially opposite convex or suction second side. The airfoil has a span or longitudinal axis extending in the radial direction from the centerline of the rotor disk to which it is attached, and various chords extending generally axially between the leading to trailing edges. The airfoil typically twists from its root to its tip for maximizing aerodynamic performance.

Wide chord fan blades have a relatively low aspect ratio which is its span to chord ratio and are relatively heavy when formed as solid metal parts. Weight reduction is typically obtained by using high strength superalloy materials such as those including Titanium. However, as engines grow larger in size the corresponding fan blades increase in size and weight, and increase the difficulty in achieving a suitable life therefor under the high centrifugal loads generated during operation.

In separate developments, all composite fan blades have been designed for reducing weight while providing acceptable performance in the gas turbine engine environment. A typical composite blade includes several layers of structural fibers, such as graphite, embedded in a suitable matrix, such as epoxy, for tailoring blade strength in a lightweight structure. Composite blades require a complex manufacturing process and are expensive to produce.

Hybrid blades are also being developed which are primarily metal, such as Titanium, having suitable pockets therein for reducing weight, with the pockets being filled with a suitable filler material for completing the required aerodynamic profile of the airfoil. However, pockets in an otherwise structural airfoil reduce the stiffness thereof, or the corresponding moments of inertia, and thus create an additional problem in vibratory performance and foreign object damage (FOD) resistance.

More specifically, during operation a fan blade is subject to centrifugal force, aerodynamic force, and vibratory stimuli due to the rotation of the fan blades over the various operating speeds of the engine. A fan blade has various modes of resonant vibration due to the various excitation forces occurring during engine operation. A fan blade is basically cantilevered from its rotor disk and therefore may bend or flex generally in the circumferential direction in fundamental and higher order modes of flexure or flex. The airfoil is also subject to fundamental and higher order torsional modes of vibration which occur by twisting around the airfoil span axis. The flex and torsion modes of vibration may also be coupled together further increasing the difficulty of blade design.

Hybrid blades which include weight lightening pockets therein are also subject to local panel modes of vibration due to the remaining thin metal at the base of the pockets which may separately vibrate. In addition to these various modes of vibration of the individual blades, the full row of blades on a rotor disk may vibrate collectively in group modes.

Although hybrid blades being developed allow a substantial reduction in blade weight, the open ended pockets therein necessarily decrease both the bending and torsional stiffnesses, or moments of inertia, of the airfoil which adversely affects the various vibration modes. For example, the pockets reduce bending stiffness and may correspondingly lower the resonant frequency of the fundamental flex mode. This in turn decreases the frequency margin between the fundamental blade vibratory mode and the conventional 1/rev fundamental excitation frequency of the engine. The smaller the frequency margin, the greater is the excitation response and resulting vibratory displacement and stress, which may be reduced by suitable damping. The pockets also decrease the torsional bending stiffness of the blade which leads to reduction in frequency margin between torsion modes and adjacent flex modes, for example. This too may lead to undesirable blade excitation during operation from aerodynamic excitation forces.

Since the fan blades are the first rotating structure in a gas turbine engine which receives intake air, they are also subject to foreign object damage (FOD), due to birds strike for example. Typical fan blades are therefore also designed to have suitable FOD strength, with flexibility at the leading edge region of the blade for withstanding a bird strike with little or no permanent damage thereto. The pockets being developed for hybrid blades necessarily decrease the stiffness of the airfoil aft of the leading edge thusly decreasing the ability of the airfoil to withstand foreign object damage.

Accordingly, it is desired to provide an improved hybrid fan blade having specifically configured pockets for frequency tuning the blade and maintaining FOD resistance.

SUMMARY OF THE INVENTION

A fan blade includes a metal airfoil having first and second opposite sides extending radially between a root and tip, and axially between a leading edge and a trailing edge. The airfoil further includes a plurality of pockets disposed in the first side and separated by corresponding ribs. A filler is bonded in the pocket, and is coextensive with the airfoil first side. Radial and diagonal ribs respectively intersect solely each other for selectively increasing torsional and bending stiffness to increase frequency margin between adjacent torsional and bending resonant modes of vibration.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
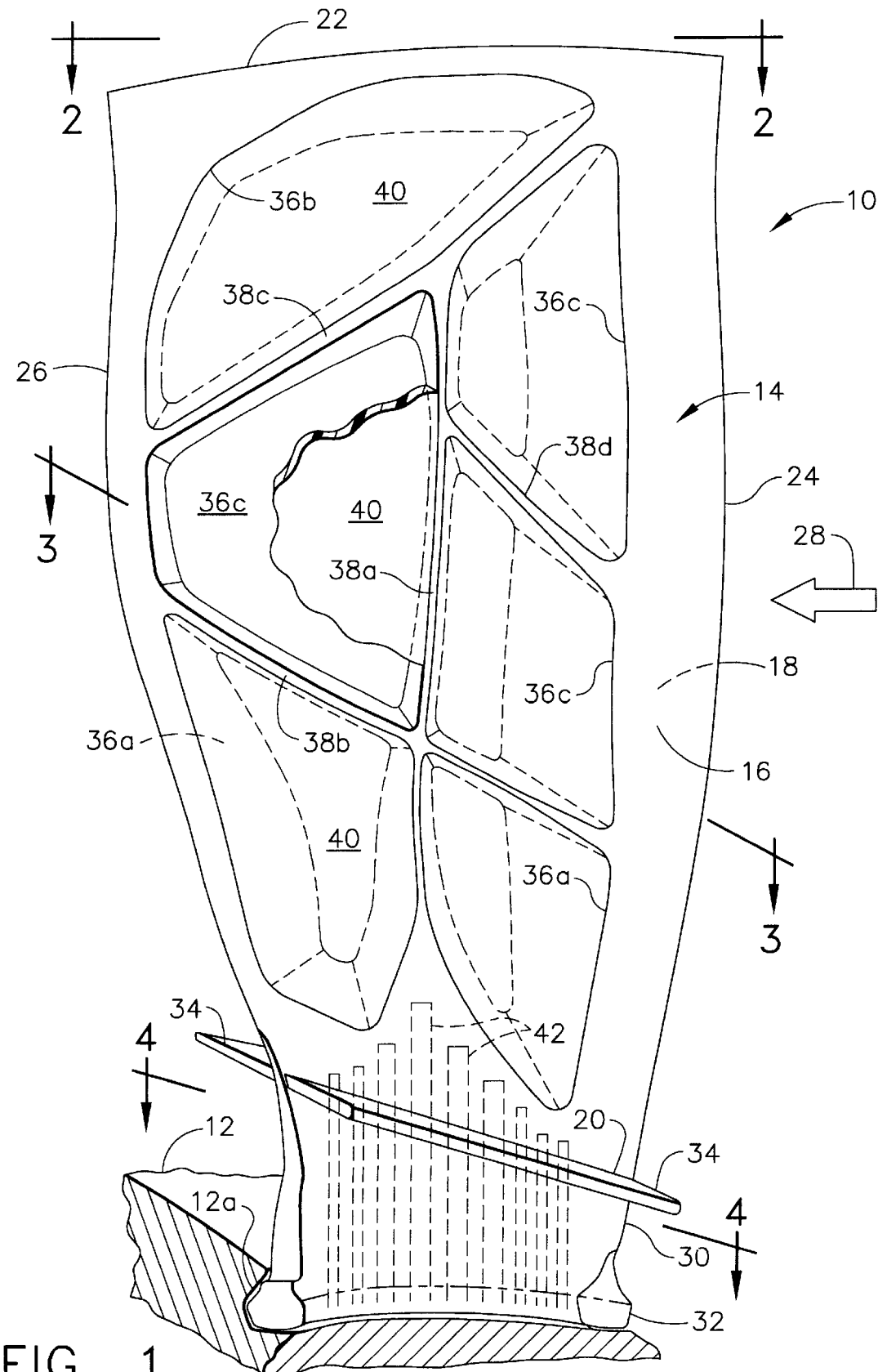
FIG. 1 is an elevational view of an exemplary gas turbine engine hybrid fan blade including specifically configured pockets in accordance with an exemplary embodiment of the present invention.

Illustrated in FIG. 1 is one of several exemplary gas turbine engine fan rotor blades 10 mounted to the perimeter of a rotor disk 12 shown in part. In accordance with the present invention, the blade 10 is configured as a hybrid blade including a metal airfoil 14 having a first or pressure side 16 which is generally concave, and a circumferentially opposite second or suction side 18 which is generally convex. The first and second sides or surfaces 16,18 extend radially along the span of the airfoil 14 between a radially inner root 20 and an opposite radially outer tip 22.

The first and second sides also extend axially along the chord of the airfoil between a forward or leading edge 24 of the airfoil and an axially opposite aft or trailing edge 26. Ambient air 28 flows over the two airfoil sides from the leading edge to the trailing edge during operation and is pressurized by the airfoil in a conventional manner for producing propulsion thrust during operation for powering an aircraft in flight.

Although the airfoil 14 may be integrally or directly mounted to the rotor disk 12 in a one piece assembly known as a blisk, in the exemplary embodiment illustrated in FIG. 1 each of the airfoils 14 is removably attached to the disk 12 in a conventional manner. More specifically, the blade 10 further includes an integral metal shank 30 joined integrally with the airfoil root 20 for mounting the blade to the rotor disk 12. This is effected using a conventional metal dovetail 32 joined integrally with the shank 30 for mounting the blade in a complementary dovetail slot 12a in the rotor disk. The airfoil 14, shank 30, and dovetail 32 may initially be formed as a one-piece or unitary metal structure such as by forging. A suitable metal for the fan blade 10 is Titanium, for example.

The dovetail 32 is typically an axial-entry dovetail which is captured in a complementary axial dovetail slot 12a in the perimeter of the rotor disk 12. The shank 30 provides a structural transition from the dovetail 32 to the aerodynamic airfoil 14, and is typically not an aerodynamic member itself. The shank 30 is typically hidden from the airflow 28 by a suitable flow bounding platform 34 disposed at the airfoil root 20 either integrally therewith or as separately mounted platforms between adjacent ones of the blades 10 in a conventional manner.

In accordance with the present invention, the airfoil 14 further includes a plurality of recesses or pockets designated by the prefix 36 which preferably are disposed solely in the airfoil first or pressure side 16 and are separated by corresponding metal spars or ribs designated by the prefix 38. The ribs 38 are integrally formed in the airfoil 14 and are part of the unitary metal structure thereof. A suitable number of the pockets 36 are provided over the airfoil 14 for substantially reducing its weight while maintaining structural integrity thereof in accordance with the present invention.

The pockets 36 may be suitably formed by machining or casting, for example, and are closed at their bottom ends by the remaining relatively thin portions of the airfoil second side 18, and are open along the airfoil first side 16. By providing the pockets 36 in the airfoil concave side 16, the convex side remains solid metal to maximize moment of inertia stiffness.

The individual pockets 36 are filled with a suitable lightweight filler 40 which may be bonded into the pockets 36. The filler 40 completely fills each pocket 36 and is coextensive at its outer surface with the airfoil first side 16 for providing an aerodynamically smooth and continuous surface meeting the required aerodynamic profile for the first side 16. The filler 40 may take any suitable form such as an elastomeric-like rubber bonded in the pockets. The filler is lighter in weight or density than the metal of the airfoil 14 for reducing overall weight of the blade 10 while maintaining a suitable aerodynamic profile thereof. The filler 40 also preferably provides internal damping for reducing the vibratory response of the airfoil 14 during operation.

In accordance with a preferred embodiment of the present invention, the ribs 38 include solely radial and diagonal ribs respectively intersecting solely each other for selectively increasing torsional and bending stiffness to increase frequency margin between adjacent torsional and bending resonant modes of vibration. The ribs have predetermined orientations in the airfoil 18 to specifically tune the vibratory response of the airfoil 14 for decreasing undesirable response thereof.

As indicated above, fan blades like the one illustrated in FIG. 1, have inherent flexural and torsional modes of vibration at specific resonant frequencies. In the exemplary embodiment illustrated, the first vibratory mode is the first flex mode in which the airfoil 14 bends generally circumferentially about the dovetail 32 like a simple cantilever. The second vibratory mode is the second flex mode wherein the airfoil 14 includes a node of zero vibratory displacement, with opposite flexural displacement above and below the node.

The third vibratory mode is the first torsional mode where the airfoil oscillates or twists about its span axis relative to the dovetail 32. And, a fourth vibratory mode is the third flexural mode having two nodal lines of zero displacement and a changing displacement across the node lines. The associated resonant frequencies for the first four modes increase in magnitude from the first to the fourth mode, with each mode occurring at a discrete resonant frequency. Of course, additional higher order modes of vibration are known which occur at even higher resonant frequencies but require higher energy for excitation. The first four modes in this exemplary embodiment are subject to excitation in the gas turbine engine fan blade due to aerodynamic excitation forces or the 1/rev excitation force.

A fully solid fan blade enjoys maximum bending and torsional stiffness, or moments of inertia. A relatively simple hollow fan blade with a complete metal perimeter has a corresponding reduction in bending and torsional stiffness. And, by introducing pockets into one side only of a fan blade, both bending and torsional stiffness are further reduced. The changes in bending and torsional stiffness directly affect the various resonant frequencies and the corresponding mode shapes be they flexural, torsional, or combinations thereof.

In a hybrid blade having symmetrical pockets therein defined by primarily radial ribs, or axial ribs, or both, significant reductions in both the bending and torsional stiffness are found which cause undesirable excitation of the first vibratory mode, for example. The first vibratory flex mode may have a relatively small frequency margin with the 1/rev excitation force. And the higher order flex and torsional modes may be relatively close together in frequency and also subject to excessive vibratory response during operation.

Accordingly, it is desired to specifically configure the pockets 36 and ribs 38 to increase the frequency margins between the first several vibratory modes as well as increasing the frequency margin of the fundamental mode relative to the 1/rev.

This is effected in accordance with the present invention by selective rib placement in the airfoil 14 for obtaining preferred cross section stiffnesses for tuning the resonant frequencies and frequency margins therebetween for promoting blade stability while achieving a substantial reduction in weight. In the exemplary embodiment illustrated in FIG. 1, a radial rib 38a is disposed generally mid-chord between the leading and trailing edges of the airfoil to axially separate the several pockets 36 between the airfoil root 20 and tip 22. A pair of diagonal ribs 38b,c extend integrally from the leading edge 24 to the trailing edge 26 to radially separate the pockets 36, and are integrally joined to the radial rib 38a therebetween. The perimeter of the airfoil 14 along its leading and trailing edges and root and tip is continuous metal between which the various metal ribs extend for providing collective stiffness.

Figure 2:
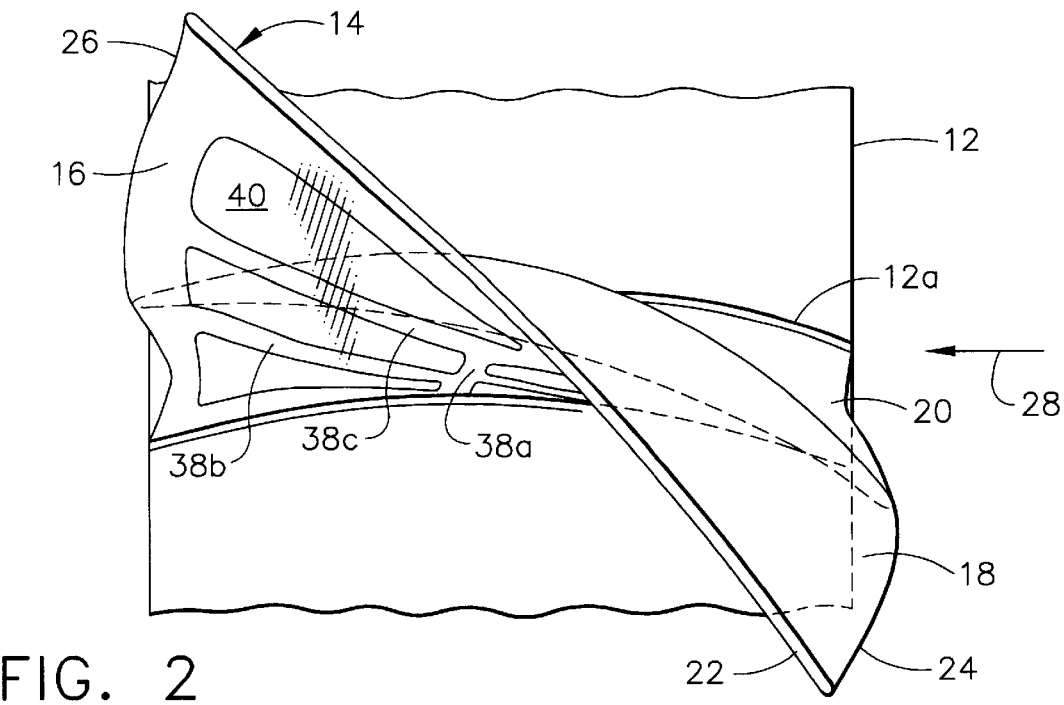
FIG. 2 is a top view of the fan blade illustrated in FIG. 1 mounted in its rotor disk and taken generally along line 2—2.

As shown in FIG. 2, the airfoil 14 preferably twists from its root 20 to its tip 22 for conventional aerodynamic reasons, and has an exemplary twist angle of about 60°. The diagonal ribs 38b,c follow the twist of the airfoil 14 since they extend both axially and radially between the leading and trailing edges and are therefore corresponding twisted or helical in configuration. The diagonal ribs 38b,c therefore provide a three dimensional rigid connection between the leading and trailing edges to primarily increase torsional stiffness or polar moment of inertia.

Figure 3:
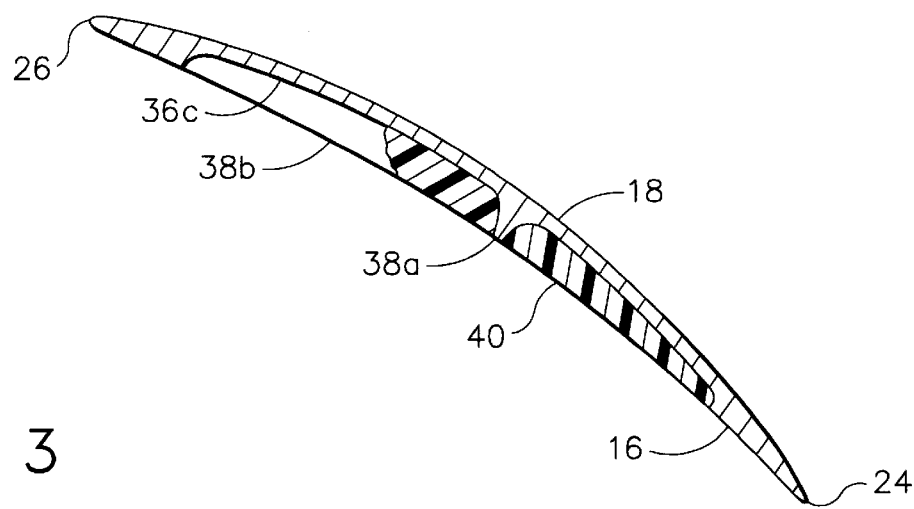
FIG. 3 is a radial sectional view through a mid-span portion of the airfoil illustrated in FIG. 1 atop a diagonal rib therein and taken along line 3—3.

As shown in FIGS. 1 and 3, the first diagonal rib 38b is the lowermost diagonal rib disposed generally below the mid-span of the airfoil 14 and intersects the radial rib 38a to define at least a pair of root pockets 36a. The root pockets 36a are preferably spaced radially outwardly from the airfoil root 20 in accordance with a preferred embodiment of the present invention for selectively increasing both the bending and torsional stiffness of the airfoil 14 immediately adjacent to the airfoil root 20 for increasing the resonant frequencies of the fundamental flex and torsional modes of vibration.

Figure 4:
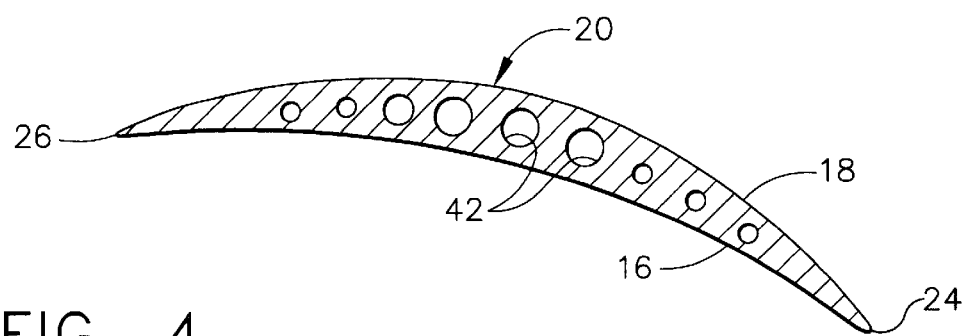
FIG. 4 is a radial sectional view through the airfoil portion of the blade illustrated in FIG. 1 near its root and taken along line 4—4.

Correspondingly, the radial section of the airfoil root 20 between the leading and trailing edges and first and second sides is preferably a closed contour as illustrated in FIG. 4 for maximizing the bending and torsional stiffnesses within the aerodynamic profile of the root 20, without introducing the pockets therein which would undesirably interrupt the torsional strength of the section. The airfoil 14 is preferably closed in section over a predetermined span extent between the bottom of the root pockets 36a and the root 20 itself for selectively increasing both bending and torsional stiffness. The integral shank 30 similarly has a closed section for maintaining stiffness of the blade at the juncture with the dovetail 32.

In this way, the closed-section root portion of the airfoil 14 maintains a relatively high fundamental flex mode frequency providing a suitable frequency margin over the 1/rev. Furthermore, the fundamental torsional mode is also at a relatively high frequency. Since the first diagonal rib 38b is generally helical and extends over a corresponding portion of the airfoil span in the bottom portion of the airfoil 14, it is specifically tailored for increasing the torsional stiffness of the airfoil without otherwise coupling together different vibratory modes of vibration. In this way, an increase in frequency margin between the first torsional mode and the next lower flex mode may be obtained. This improves the vibratory response of the blade in operation by further uncoupling these adjacent vibratory modes.

In order to further reduce the weight of the blade 14, the closed-section of the root portion of the airfoil below the root pockets 36a may include a plurality of bores 42 extending radially through the shank 30 and airfoil root sections to below the root pockets 36a. The bores 42 effectively reduce weight without substantially reducing either the bending or torsional stiffness of the blade in the shank and root regions.

As shown in FIG. 1, the second diagonal rib 38c is spaced radially above the first diagonal rib 38b and intersects the airfoil tip 22 adjacent one of the leading and trailing edges 24,26. In the preferred embodiment illustrated, the first and second diagonal ribs 38b,c are nonparallel, and converge from the leading edge 24 toward the trailing edge 26. In an alternate embodiment (not shown), the two ribs 38b,c could be parallel to each other but would significantly affect the vibratory response of the blade.

Like the first diagonal rib 38b, the second diagonal rib 38c intersects solely the common radial rib 38a at its radially outer end. The second diagonal rib 38c in the exemplary embodiment illustrated in FIG. 1 defines with the airfoil tip and trailing edge a single corresponding tip pocket 36b, with additional ribs therethrough not being required for frequency tuning.

It is desired to limit the number of ribs found in the airfoil 14 to prevent undesirable vibratory coupling between the various resonant modes, and instead specifically tune the airfoil 14 for desired frequency margins. Since the outer portion of the airfoil 14 as illustrated in FIGS. 1 and 2 is relatively thin compared to the radially inner portion thereof, the outer portion is relatively flexible and subject to higher order modes of vibration. By selectively introducing the second diagonal rib 38c across the outer span of the airfoil 14 between the corner of the airfoil at the juncture of the leading edge and tip to a lower span juncture along the trailing edge 26, increased bending and torsional stiffnesses of the outer portion of the airfoil are provided. The second diagonal rib 38c effectively increases the frequency margin between corresponding flexural and torsional modes of vibration on the outer portion of the airfoil without compromising vibratory performance of the lower portion of the airfoil.

The radial rib 38a and the first and second diagonal ribs 38b,c define a plurality of mid-span pockets 36c therebetween. In the exemplary embodiment illustrated in FIG. 1, a fourth diagonal or bridging rib 38d is spaced radially between the first and second diagonal rib 38b,c, and extends axially between the leading edge 24, near mid-span, and the radial rib 38a at mid-chord to specifically stiffen the leading edge 24. Since the two diagonal ribs 38b,c diverge from the trailing edge to the leading edge, a relatively tall pocket would otherwise be defined behind the leading edge 24 without the bridging rib 38d.

The leading edge 24 is subject to substantial aerodynamic loads during operation as well as impact loads due to FOD such as by bird strike. The bridging rib 38d provides a structural link between the leading edge 24 and the radial rib 38a which locally increases the stiffness of the leading edge 24 and carries loads therefrom aft to the radial rib 38a. The bridging rib 38d is preferably diagonal from the leading edge 24 and inclined radially outwardly toward the trailing edge 26 for further tailoring the vibratory response of the blade 10.

Accordingly, by the selective introduction of the diagonal and radial ribs in the airfoil 14 illustrated in FIG. 1, the blade 10 may be specifically tuned for resonant frequencies and frequency margins which reduce vibratory response. Additional ribs are not preferred unless they are specifically tuned for discrete vibratory modes and do not adversely couple together different vibratory modes. An additional radial rib may be used to define three columns of pockets (not shown), with the two diagonal ribs 38b,c extending thereacross. And, a longer airfoil may require another tuning diagonal rib for additional torsional stiffness.

The preferred number of pockets and placement of the ribs may be varied for each specific design for the requirement of resonant frequencies and frequency margin for enhancing blade stability during operation. This may be accomplished in systematic trial and error, or by analysis using suitable computational algorithms specifically designed therefor. Several iterations may be required since the configuration of each pocket and rib affects overall vibratory response.

The preferred configuration of the pockets and ribs in accordance with the present invention maintains the weight reduction benefits of the pockets while tailoring the vibratory response to avoid undesirable resonant modes during operation in a gas turbine engine environment subject to aerodynamic and 1/rev excitation frequencies. The filler 40 in the pockets 36 maintains the aerodynamic profile of the airfoil and aerodynamic efficiency while reducing blade weight and providing improved repairability. If the airfoil is damaged during operation, the filler 40 may be suitably removed form the pockets, the blade repaired, and new filler 40 refilled in the pockets 36, with the blade then being returned to service.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan blade comprising:
   a metal airfoil having first and second opposite sides extending radially between a root and a tip, and axially between a leading edge and a trailing edge for pressurizing air channeled thereover;
   said airfoil further including a plurality of pockets disposed in said first side and separated by corresponding ribs;
   a filler bonded in said pockets, and being coextensive with said airfoil first side; and
   said ribs include radial and diagonal ribs respectively intersecting solely each other for selectively increasing torsional and bending stiffness to increase frequency margin between adjacent torsional and bending resonant modes of vibration; wherein said diagonal rib extends from said leading edge to said trailing edge and is integrally joined to said radial rib therebetween.

2. A blade according to claim 1 wherein said airfoil twists from said root to said tip, and said diagonal rib is correspondingly helical.

3. A blade according to claim 2 further comprising:
   a first one of said diagonal ribs intersecting said radial rib to define a pair of root pockets spaced radially outwardly from said airfoil root; and
   said airfoil has a closed root section between said root pockets and said root for selectively increasing both bending and torsional stiffness.

4. A blade according to claim 3 further comprising a second one of said diagonal ribs spaced radially above said first diagonal rib and intersecting said airfoil tip adjacent one of said leading and trailing edges.

5. A blade according to claim 4 wherein said first and second diagonal ribs are non-parallel.

6. A blade according to claim 5 wherein said first and second diagonal ribs converge from said leading edge toward said trailing edge.

7. A blade according to claim 6 wherein said radial rib and said first and second diagonal ribs define a plurality of mid-span pockets therebetween, and further comprising a bridging rib spaced radially between said first and second diagonal ribs, and extending axially between said leading edge and said radial rib to stiffen said leading edge against loading thereon.

8. A blade according to claim 4 wherein said filler is elastomeric for damping vibration of said airfoil.

9. A blade according to claim 4 further comprising:
   a shank joined integrally with said airfoil root; and
   a dovetail joined integrally with said shank for mounting said blade to a rotor disk.

10. A blade according to claim 9 further comprising a plurality of bores extending radially through said shank and airfoil root section to below said root pockets.

11. A blade according to claim 4 wherein said first side is generally concave.

12. A blade according to claim 4 wherein said ribs include solely said radial and diagonal ribs.

* * * * *